US012811929B2

(12) United States Patent
Tiwari

(10) Patent No.: US 12,811,929 B2
(45) Date of Patent: Nov. 24, 2026

(54) STATIC UNIFORM RESOURCE LOCATORS HAVING PLACEHOLDER PARAMETERS FOR DYNAMIC VALUES

(71) Applicant: PAYPAL, INC., San Jose, CA (US)

(72) Inventor: Ankur Tiwari, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 1255 days.

(21) Appl. No.: 17/519,444

(22) Filed: Nov. 4, 2021

(65) Prior Publication Data

US 2023/0137417 A1 May 4, 2023

(51) Int. Cl.
*H04L 9/40* (2022.01)
*G06F 16/955* (2019.01)
*H04L 67/10* (2022.01)

(52) U.S. Cl.
CPC ...... *H04L 63/0853* (2013.01); *G06F 16/9566* (2019.01); *H04L 63/083* (2013.01); *H04L 63/168* (2013.01); *H04L 67/10* (2013.01)

(58) Field of Classification Search
CPC ............... H04L 63/0853; H04L 63/083; G06F 16/9566; G06F 16/955; G06F 9/547
USPC .............................................................. 726/6
See application file for complete search history.

(56) References Cited

U.S. PATENT DOCUMENTS

2018/0097905 A1* 4/2018 Todasco .................. H04L 67/02
2021/0056561 A1* 2/2021 Pavlov .................... H04L 63/08

OTHER PUBLICATIONS

Gilbert, Robert "Information exposure through query strings in url," OWASP, [retrieved on Feb. 4, 2022]. Retrieved from the internet: <URL: https://owasp.org/www-community/vulnerabilities/Information_exposure_through_query_strings_in_url>.

Synopsys Editorial Team "Secure URL redirection remediation," Nov. 1, 2010, Synopsys, [retrieved on Feb. 4, 2022]. Retrieved from the internet: < https://www.synopsys.com/blogs/software-security/secure-url-redirction-remediation/>.

* cited by examiner

*Primary Examiner* — Vivek Srivastava
*Assistant Examiner* — Hien V Doan
(74) *Attorney, Agent, or Firm* — Haynes and Boone, LLP

(57) ABSTRACT

There are provided systems and methods for static uniform resource locators having placeholder parameters for dynamic values. A service provider may provide one or more online computing services and/or resources, which require navigation to using a web browser or other application to access and/or view data. This may correspond to a displayable webpage, which may have database-driven data that is specific to a certain navigation request and/or user based on a dynamic URL having variable parameters. To mask sensitive data in the variable parameters, the service provider may first mask the data in the variable parameters using one or more static strings, where the static strings are identified in the URL using placeholder parameters. When the navigation is executed, the service or resource receiving the navigation may parse the URL to identify the static strings and may execute operations to determine the dynamic data and properly output data.

20 Claims, 6 Drawing Sheets

STATIC UNIFORM RESOURCE LOCATORS HAVING PLACEHOLDER PARAMETERS FOR DYNAMIC VALUES

TECHNICAL FIELD

The present application generally relates to uniform resource locators (URLs) and more particularly to static URLs generated by replacing variable parameters in dynamic URLs with static strings that mask sensitive data.

BACKGROUND

An online service may provide services to users (e.g., customers including end users and merchants) that may be associated with online shopping, merchant marketplaces, and/or transaction processing. These services may include those associated with managing different accounts, resources, data, merchant marketplaces, and/or the like. This may be performed through one or more centralized frameworks, platforms, applications, portals, and/or dashboards, where access to and/or use of other computing services and resources may be provided and managed through the centralized online location. For example, a web browser and/or dedicated software application may provide one or more interfaces where a user of the service provider may navigate to different computing services, additional interfaces, webpages, and/or online resources. However, navigation may be performed by using URLs for the computing services and resources, where the URLs may include variable parameters and therefore be dynamic. However, where the variable parameters include sensitive data, information exposure may introduce risk of data misappropriation and/or fraud. For example, a dynamic URL may include a variable parameter for a user or merchant identifier, authorization token, session identifier and/or expiry, and the like. When used, processed, and/or passed between systems and/or computing services, attacks may obtain sensitive data including usernames, passwords, tokens, and the like.

Figure 1:
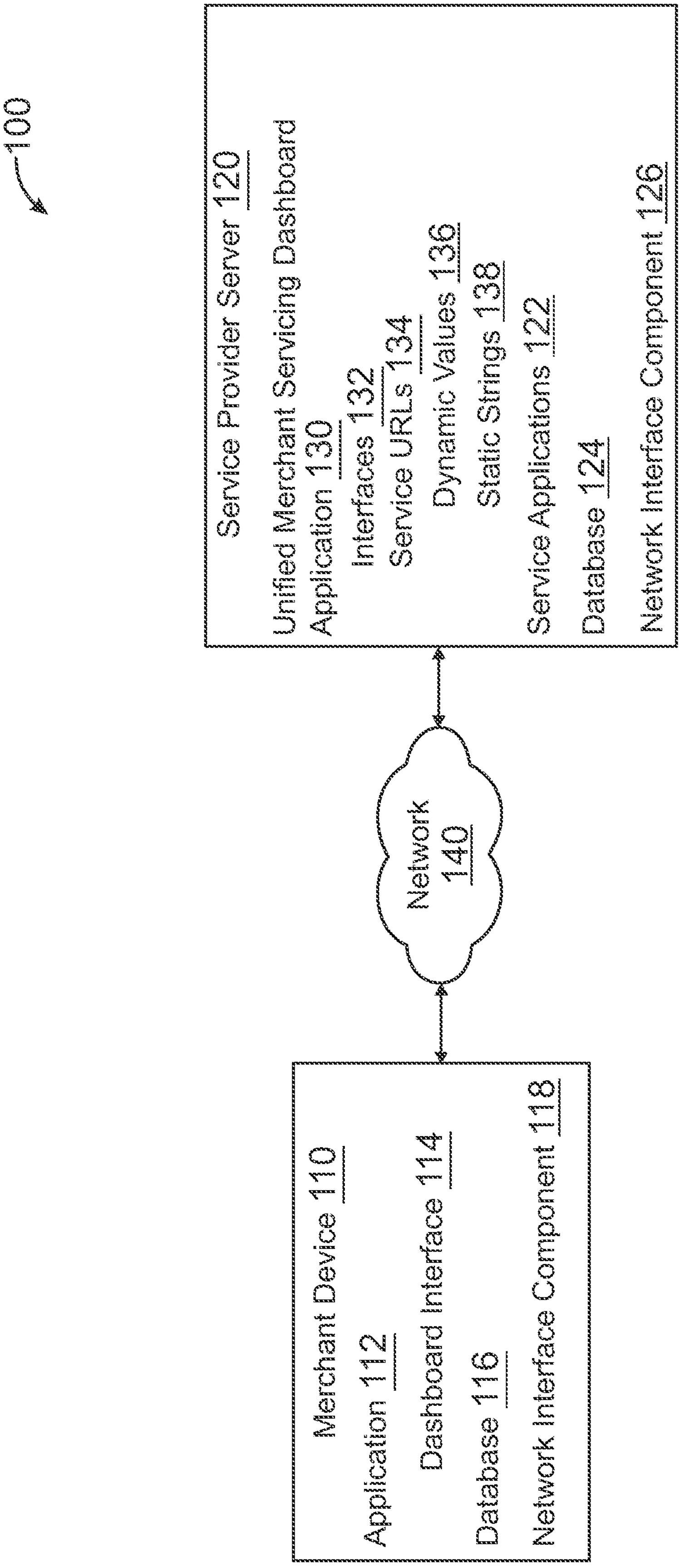
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for generating static uniform resource locators having placeholder parameters for dynamic values. Systems suitable for practicing methods of the present disclosure are also provided.

An online service provider may provide computing services to end users, which may be accessed through a website, web application, and/or resident software application. The computing services may be associated with electronic transaction processing, consumer and/or merchant accounts, and/or digital merchant marketplaces and stores. The computing service may also include social networking, microblogging, media sharing, messaging, business and consumer platforms, etc. In order to process transactions, including sales by merchants, a user (e.g., consumer, merchant, or the like) may use a digital account and/or digital wallet to process payments through an electronic card or transaction network associated with the service provider and/or an online transaction processor. A digital account of the user with the online transaction processor (e.g., PAYPAL®, VENMO®, etc.) may provide electronic transaction processing services to users and/or merchants. In this regard, the service provider may provide platforms, dashboards, applications, and the like that may be used to access computing services and resources through a centralized online location and link between different computing services and resources.

However, in order to link, redirect, and/or navigate between different interfaces, websites, and/or computing services or resources, the service provider may execute navigations using URLs. A navigation corresponds to a request to access an online resource, including accessing a webpage or data that is loaded to an application interface (e.g., of a mobile application on a mobile device). Thus, a navigation may include initially a computing device entering a URL or receiving a clickthrough event of a selectable link or interface option. This may cause a URL to be processed by the computing device to navigate a web browser or application interface to the online resource. The online resource may then be called based on the navigation, where the online resource then returns data to the computing device for loading in the web browser or application interface. This may be done using dynamic URLs, which have variable parameters that include dynamic values, data, or the like that may change between different navigations requests and/or users of the service provider's system and computing services. For example, a variable parameter may allow a merchant using a centralized platform (e.g., website and/or application), dashboard, and/or interface to have their merchant identifier (ID) entered in the variable parameter so that when navigation occurs to a computing service or resource, such as another website of a linked computing service, then the computing service may automatically customize and/or load data. However, the variable parameter may contain sensitive data or data the user and/or the service provider would not want known to non-intended recipients, such as fraudsters, which may be exposed to non-intended recipients through the dynamic URL.

Accordingly, in various embodiments, where this data may be secure and/or sensitive, the service provider may mask this dynamic data in the variable parameter by replacing the data with a static string, value, data, or other text and/or symbols in the URL. This may act as a placeholder and, further, a placeholder parameter ID or portion of the URL may be added to the URL that designates what the static string is in the URL. This placeholder parameter may be added or appended to the URL. This allows another system to determine, when receiving the navigation request to the computing resource using the URL, what is the static string and what the static string intends to replace. A mapping and/or another system may then be used to fetch, retrieve, and/or request the dynamic data for the variable parameter in a secure backend system and/or server, which allows proper navigation without exposing the sensitive data in the URL and/or during the navigation.

For example, a consumer or merchant (e.g., referred to herein as a "user" or "users") may utilize an online service provider to access and online account and/or interact with different online entities, computing services, and/or resources. This may include operations for processing a purchase of one or more items in a transaction. Selection of one or more items during an online transaction with a merchant website may require a payment instrument from the user for electronic transaction processing. A user may establish and/or maintain an account for processing one or more transactions between the user and one or more other users with an online service provider or transaction processor (e.g., PAYPAL®). An account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions for items. However, in other embodiments, the account creation may be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and the other transaction processing services. In this regard, the service provider may also provide one or more online resources, portals, websites, and/or the like that may be used to access the account, navigate and/or link to computing services, utilize such computing services, and/or otherwise gain access to computing resources and/or data.

For example, once the account of the user is established with the service provider, the user may utilize the account via one or more computing devices, such as a personal computer, tablet computer, mobile smart phone, or the like. The user may engage in one or more online or virtual interactions through the online platforms, websites, and/or resources for the service provider's computing resources. When navigating to computing services or cross-linking between different computing resources and/or from a dashboard interface and/or portal, one or more URLs may be used by a web browser and/or dedicated software application in order to navigate to the computing services and resources of the service provider.

In this regard, a URL may correspond to a network resource address, such as a website address, individual webpage address for a website, and/or component or program on a webpage. A URL may correspond to a subset of uniform resource identifiers (URIs) that includes protocols for access to webpages, web applications, online resources, computing services, and the like. A URL may include a protocol or schema (e.g., https://), a sub domain (e.g., www., shop., blog., etc.), a second-level or root domain (e.g., a website name), a top-level domain (e.g., .com, .gov, .edu, etc.), as well as additional components including subdirectories and/or URL parameters. In this regard, a dynamic URL may include one or more variable parameters that may include data specific to the navigation being executed by the specific computing device, server, and/or system, such as data specific to the requester of the navigation (e.g., a user, device, account, computing service, interface, etc.). Dynamic URLs may differ from static URLs by including these variable parameters that lead to a dynamic webpage, computing service, application, and/or resource that loads data from the dynamic URL and/or by a database-driven website. Thus, dynamic URLs may include dynamic values and data within these variable parameters, which may be sensitive and cause risk if exposed and/or misappropriated. A dynamic URL may therefore have variable and/or query parameters to retrieve database data and/or enter specific data and may also include file extensions for variable data strings.

A service provider, such as an online transaction processor, that includes multiple different computing services, websites, applications, and/or online resources (which may be referred to herein as a "component" or "components" of the corresponding service provider) may navigate between these different components using dynamic URLs. For example, the service provider may provide a centralized hub, which may correspond to a website, application, and/or dashboard that enables a user to navigate between different and separate components of the service provider. This centralized hub may allow a merchant to view data from multiple different computing services and/or navigate to the computing services, such as a sales and marketplace data service, a transaction history service, a dispute resolution service, a digital wallet service, and/or a payment processor service. However, navigating between different components of the service provider's system and computing architecture may utilize different navigation schema and URLs.

In this regard, one or more backend systems and/or components may utilize dynamic URLs during navigation in order to provide a specifically customized and/or database-driven service during navigation. A dynamic URL may be used to authenticate the user to the next computing service or otherwise pass some information that may be used to customize the webpage, resource, computing service, or the like provided by the component of the service provider's computing architecture. For example, the dynamic URL may include a user or merchant ID, provide an authentication token or other tokenized data, or pass sensitive data including passwords or other authentication credentials. Thus, the dynamic URL may be used to provide data used by the component when executing a navigation and providing data to a user and/or identify/authenticate the user. However, values and/or data in variable parameters may be exposed in a Referer HTTP request header, web logs, shared systems, a browser history and/or cache, and/or if a nearby fraudster (e.g., in a real-world environment) is spying on your device (e.g., shoulder surfing).

Due to risk of exposure to fraudsters, bad actors, and external devices or systems (e.g., via man-in-the-middle attacks and the like), the service provider may utilize one or more operations to mask or hide query strings and other dynamic and/or variable parameters in dynamic URLs when crosslinking and/or navigating between different components. In this regard, the real values and/or data for variable parameters may be masked with a static string or other static ID, text, or data that is the same between different entities and does not compromise dynamic values or data that may be sensitive. The service provider may parse the dynamic URL to identify any variable parameters and correspond values or data in those parameters. For example, a variable parameter for a merchant ID may have a dynamic value or string for the merchant's real ID, which may be compromised as discussed herein. A replacement that acts as a static value or string may correspond to "merchant_id", which contains no sensitive data but identifies the parameter in the URL as associated with the merchant's real ID.

Thus, when parsing the dynamic URL for variable parameters and dynamic values or data, the service provider's systems and/or operations may determine parameters including sensitive data that may be compromised via information exposure from dynamic URLs and/or unvalidated URL redirections and/or forwards (e.g., using URL redirection utilities). This may be identified based on rules, mappings, and/or the like for identification of variable parameters that may contain sensitive data. Further, the service provider may use multiple different static strings depending on the variable parameter that is replaced, for example, to identify the type and/or data for the variable parameter.

The service provider may convert a dynamic URL to a "static" URL having static strings in place of dynamic strings, value, and/or data in the URL. This static URL may also benefit legacy computing systems that may not be capable or structured to handle dynamic URLs directly during navigations. To further identify the static strings in the URL that replace the variable parameters, the service provider may add or append a placeholder parameter and/or ID to the URL, which identify the parameters of the URL that include the static string(s). For example, with the above "merchant_id" static string, a placeholder parameter may be added to the URL as "placeholder=merchant_id", which identifies that merchant_id is a static string replacing dynamic data for a variable parameter. Thereafter, a backend server or system of the component being navigated to, such as the one receiving the URL, may parse the URL and interpolate that, in the URL, merchant id as the static string should be replaced with the actual merchant ID (e.g., the sensitive value or data). Thus, the placeholder parameter and/or ID may identify the static string, and what the static string should be replaced with when executing the navigation by the backend server or system.

In order to resolve these URLs dynamically and/or load database-driven webpages or other computing services and resources, the service provider may also provide a backend mapping of the static strings to correspond dynamic values or data for the variable parameters corresponding to the portions of URL having the static strings (e.g., in place of the variable parameters in the dynamic URL). The mapping may correspond to one or more database tables and/or database IDs that allows for retrieval by the backend server(s) and/or system(s) of the navigated component so that the URL may be properly processed, and the navigation executed, by those server(s) and/or system(s). The transaction processor may therefore provide one or more application programming interface (API) integrations between different applications, microservices, decision services, and/or digital platforms of the transaction processor's system. The API integrations may allow for API calls and requests to be executed to track, request, and/or receive dynamic values, strings, and/or data from different components of the service provider for dynamic data in variable parameters that replaces the static strings in a received and processed URL.

In other embodiments, when the URL is received, the server(s)/system(s) of the navigated component may replace the static string in the URL by querying a secondary system for the dynamic data and/or a token that may be used to determine the dynamic data. The server(s)/system(s) may execute a call that queries the secondary system for the dynamic data corresponding to the static string. For example, an authentication code may be generated and/or associated with a session between a computing device and the first component (e.g., based on a session cookie). When navigating to a second component using the URL with one or more static strings, the authentication code may be provided for that session, which may be used to retrieve a token, such as a universal access token (UAT) from an Open Authentication API for the service provider. The UAT may enable retrieval of sensitive data that may be replaced in the URL for the static string(s) so that the proper navigation may be executed for the underlying dynamic URL. Thus, the URL may be passed when the correspond device navigates from the first server(s)/system(s) to second server(s)/system(s) for processing by that second server(s)/system(s), which may replace the static strings with dynamic values for the variable attributes.

For example, when navigating from a first webpage or computing service to a second webpage or computing service, the server of the second webpage/service may receive the URL having the static strings masking the dynamic data for the variable attributes. The server may then interpolate the dynamic data for the URL and execute the navigation using the URL and dynamic data. Thus, the proper, customized, and/or dynamic computing service, resource, database, or webpage may be navigated to and properly output and/or displayed on a computing device requesting the navigation between different components of the service provider's system. The replacement may be done by the mapping and/or API call or request for the data from one or more other computing resources. These operations allow for more secure and improved navigations between different services, resources, webpages, and the like. Further, the masking and securing of URLs from information exposure and fraudster may occur automatically and in faster and more coordinated manner between different systems, servers, and/or devices. The operations discussed herein may be performed without requiring additional user inputs and authentications when navigating between computing services and resources, thereby reducing the need to re-authenticating users and/or requiring additional data input that may occur without using dynamic data in URLs.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a merchant device 110 and a service provider server 120 in communication over a network 140. Merchant device 110 may be used to access, browse, and/or utilize services provided by service provider server 120, such as those that may be used to generate and/or process transactions and/or payments by a merchant with one or more customers or consumers through a payment platform, application, and/or computing services of service provider server 120. However, in other embodiments, merchant device 110 may more generally correspond to any end user, entity, or the like that may utilize services provider by service provider server 120 and navigate between different services and resources using URLs, as discussed herein. Thus, merchant device 110 may use URLs to direct a web browser and/or dedicated software application to an online system, server, and/or resource associated with service provider server 120. Merchant device 110 may be used to navigate between services and resources for service provider server 120, which may utilize the operations discussed herein to mask sensitive or confidential data that may be compromised through information exposure in dynamic URLs.

Merchant device 110 and service provider server 120 may each include or be executed using one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Merchant device 110 may be implemented using any appropriate hardware and software configured for wired and/or wireless communication with service provider server 120 for utilizing services provided by service provider server 120, such as those associated with processing payments and transactions using service provider server 120. Merchant device 110 may correspond to an individual user, consumer, or merchant that may utilize sales and/or electronic transaction processing services and platforms provided by service provider server 120. In various embodiments, merchant device 110 may correspond to a personal computing device for a merchant, for example, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. In other embodiments, merchant device 110 may correspond to a server, such as a stand-alone or enterprise-class servers, operating an OS such as a MICROSOFT® OS, a UNIX® OS, a LINUX® OS, or another suitable server-based OS. In one example, merchant device 110 may correspond to a device of a merchant that utilizes PAYPAL®, Inc. of San Jose, CA, USA for transaction processing. However, in other embodiments, merchant device 110 may be maintained by another type of entity. Although only one device is shown, a plurality of devices and/or servers may function similarly and/or be connected to provide the functionalities described herein.

Merchant device 110 of FIG. 1 contains an application 112, a database 116, and a network interface component 118. Application 112 may correspond to executable processes, procedures, and/or applications with associated hardware. In other embodiments, merchant device 110 may include additional or different software as required.

Application 112 may correspond to one or more processes to execute modules and associated devices of merchant device 110 to provide a convenient interface to permit a user for merchant device 110 to access, view, and/or utilize websites, applications, computing services, and/or resources provided by service provider server. In some embodiments, application 112 may also be used to maintain merchant websites and/or marketplaces where users may enter, view, and/or process items to purchase in a transaction. In this regard, application 112 may correspond to specialized hardware and/or software utilized by merchant device 110 that may access services for electronic transaction processing, account, merchant/sales statistics and tracking, digital wallet, dispute resolution, and the like. For example, application 112 may be used to host a website having one or more webpages or maintain a marketplace that may be used to browse items for sale and generate a transaction for one or more items. Application 112 may provide a checkout process, which may be utilized to pay for a transaction. The checkout process may be used to pay for a transaction using a payment instrument, including a credit/debit card, digital account, or the like. Application 112 may be utilized by the merchant to view one or more user interfaces (UIs), for example, via graphical UIs (GUIs) presented using an output display device of a user device. However, in other embodiments and where merchant device 110 may not correspond to a merchant, application 112 may be used for social networking, microblogging, media sharing, messaging, business and consumer platforms, etc.

In various embodiments, application 112 may be used to access and view a dashboard interface 114. Dashboard interface 114 may correspond to an interface of a centralized hub that may access different websites, computing services, APIs, processing stacks, and the like via one or more navigations, for example, to access online data and other online computing resources. Dashboard interface 114 may execute these navigations using entered webpage addresses, network resource addresses, URLs, or the like, as well as through selection of selectable weblinks, interface elements, buttons, menu items, and/or commands. These navigations may utilize dynamic URLs, which may include variable parameters having dynamic values or data. Service provider server 120 may obscure, mask, or otherwise hide this data using the operations described herein, which may assist in preventing or reducing risk of information exposure. For example, service provider server 120 may prevent exposure of data that is sensitive, confidential, authentication, financial, or the like that may exposed in a dynamic URL through a Referer HTTP request header, web logs, shared systems, a browser history and/or cache, and/or shoulder surfing.

Application 112 may correspond to a general web browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website, including payment information for the transaction. However, in other embodiments, application 112 may include a dedicated software application of service provider server 120 resident on merchant device 110 (including a mobile application on a mobile device), which may be configured to navigate between application user interfaces provided by service provider server 120 (e.g., applications interfaces displayable by a graphical user interface (GUI) associated with application 112).

Merchant device 110 may further include database 116 which may include, for example, identifiers such as operating system registry entries, cookies associated with application 112 and/or other applications, identifiers associated with hardware of merchant device 110, or other appropriate identifiers. Identifiers in database 116 may be used by a payment/service provider to associate merchant device 110 with a particular account maintained by the payment/service provider. Database 116 may also further store received data from service provider server 120, which may be temporarily cached and/or permanently stored.

Merchant device 110 includes at least one network interface component 118 adapted to communicate with service provider server 120 and/or another device or server over network 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide computing services discussed herein. Various embodiments of the system described herein may be provided by service provider server 120 and may be accessible by merchant device 110 when accessing different components of the computing system, platform, and/or architecture provided by service provider server 120. In such embodiments, service provider server 120 may interface with merchant device 110 for monitoring URL usage and detecting when dynamic URLs may require changing and/or masking of variable parameters having sensitive dynamic data. Service provider server 120 includes one or more processing applications which may be configured to interact with merchant device 110, such as using a web browser and/or software application corresponding to application 112. In one example, service provider server 120 may be provided by PAYPAL®. However, in other embodiments, service provider server 120 may be maintained by or include another type of service provider.

Service provider server 120 of FIG. 1 includes a unified merchant servicing dashboard application 130, service applications 122, a database 124, and a network interface component 126. Unified merchant servicing dashboard application 130 and service applications 122 may correspond to executable processes, procedures, and/or applications with associated hardware. In other embodiments, service provider server 120 may include additional or different modules having specialized hardware and/or software as required.

Unified merchant servicing dashboard application 130 may correspond to one or more processes to execute modules and associated specialized hardware of service provider server 120 to provide platforms, resources, and operations to unify one or more computing services and/or components of service provider server 120. In this regard, unified merchant servicing dashboard application 130 may correspond to specialized hardware and/or software used by a user associated with merchant device 110 to navigate between these services, resources, and other components, which may utilize dynamic URLs that may be converted to "static" URLs that have static strings in place of variable attributes for dynamic data. The user may establish and/or access an account with unified merchant servicing dashboard application 130 and/or access another account with service provider server 120. For example, an account provided by service applications 122 (e.g., a PAYPAL® account), which may also provide the aforementioned account services. When accessing a dashboard or other centralized processing hub or computing service, unified merchant servicing dashboard application 130 may be used by the user and/or via the account in order to access and/or navigate between different webpages, applications, computing services, and/or resources, such as through interfaces 132. Interfaces 132 may include dashboard interface 114 output on merchant device 110, where navigation using interfaces 132 may utilize one or more dynamic URLs.

Unified merchant servicing dashboard application 130 may link between the different computing services, resources, and/or other components of service provider server 120 using service URLs 134. Service URLs may correspond to one or more static and/or dynamic URLs that allow for navigations to be executed between different components and cause their corresponding backend servers and/or systems to load data for output to a device, such as merchant device 110. In this regard, service URLs may cause the device to navigate an application (e.g., a web browser and/or dedicated application) to another computing service or platform, which may return data from a navigation request and/or one or more API calls. Service URLs 134 may cause navigation by a computing device to a particular service and may be caused based on actions and/or activities occurring via interfaces 132. For example, service URLs 134 may be used to navigate to one or more webpages, applications and/or interfaces, services, and/or resources provided by service applications 122.

In this regard, unified merchant servicing dashboard application 130 may be used to update service URLs 134 having dynamic values 136 to have static strings 138 in place of dynamic values 136. This may be done by parsing and/or identifying variable attributes for dynamic values 136. Thereafter, static strings 138 may be used to mask, replace, and/or obscure dynamic values 136 in service URLs 134. This may include adding static strings 138 with one or more placeholder parameters and/or IDs in service URLs 134 so that static strings 138 may be identified by a backend server and/or system of service provider server 120. The backend server and/or system of service provider server 120 may then execute one or more operations to replace dynamic values 136 when processing the navigation request using service URLs 134 in order to identify a particular computing services, resource, application, and/or webpage and process the navigation to direct merchant device 110 to that computing services, resource, application, and/or webpage.

Service URLs 134 may thereafter be used to navigate to a computing service or resource, such as to a webpage and/or application data for loading on merchant device 110. Data may be retrieved through different API integrations to allow APIs of the platforms, services, and applications to exchange data. Unified merchant servicing dashboard application 130 may include one or more APIs that perform API calls and requests, and receive responses, in order to navigate merchant device 110 to a requested computing services, resource, application, and/or webpage. When navigating merchant device 110 to the computing services, resource, application, and/or webpage identified by one of service URLs 134, static strings 138 may be identified by a backend server and/or system of the component receiving the navigation request and URL by parsing static strings 138 in one or more of service URLs 134. Parsing may be done using placeholder parameter and/or IDs to determine what are static strings 138 in service URLs 134, and thereafter identifying the data, string, and/or values for dynamic values 136 for service URLs 134.

Determination of the data may be done using a mapping of static strings 138 to data for dynamic values 136, which may correspond to one or more database tables and the like. Further, determination of the data may be done by executing one or more API calls or request for the data, which may further utilize authentication codes and/or tokens (e.g., UATs that may be used to access sensitive data, such as based on an authentication). Once the data is determined, the backend server and/or system that receives the navigation event and URL may replace dynamic values 136 for static strings 138 in service URLs 134, or may instead utilize the data for dynamic values 136 directly in order to customize and/or output a webpage, interface, and/or other computing service or resource. Thereafter, merchant device 110 may be navigated to the corresponding component of service provider server 120 or to an external computing system and/or resource. Merchant device 110 may then display data for the corresponding navigation.

Service applications 122 may correspond to one or more processes to execute modules and associated specialized hardware of service provider server 120 to process a transaction or provide another service to customers, merchants, and/or other end users and entities of service provider server 120. In some embodiments, service applications 122 may be used by a user associated with merchant device 110 to establish a merchant and/or payment account, as well as a digital wallet, which may be used to process transactions. In various embodiments, financial information may be stored with the account, such as account/card numbers and information that may enable payments, transfers, withdrawals, and/or deposits of funds. A digital token for the account/wallet may be used to send and process payments, for example, through an interface provided by service provider server 120. The payment account may be accessed and/or used through a web browser application and/or dedicated payment application executed by merchant device 110 and engage in computing services provided by service applications 122.

In various embodiments, service applications 122 may be used when navigating to and/or between webpages, applications and/or application interfaces, computing services, digital resources, and the like. Thus, service applications 122 may provide such components that may be navigated to by merchant device 110 using service URLs 134. In some embodiments, service applications 122 may include or be associated with websites and webpages, which may correspond to one or more online websites and associated resources to provide features, services, and other operations for a merchant, seller, or the like. In this regard, the webpages of various websites may be utilized by one or more merchants to provide websites and/or online portals for transaction processing and sales. For example, service applications 122 may also be used to host a website having one or more webpages that may be used by customers to browse items for sale and generate a transaction for one or more items. Service applications 122 may further be utilized by customers and other end users to view one or more user interfaces (UIs), for example, via graphical UIs (GUIs) presented using an output display device of merchant device 110. These UIs may be used to navigate through items for sale on the merchant website, generate a transaction, and checkout for the transaction on the merchant website. Service applications 122 may process the payment and may provide a transaction history to merchant device 110 for transaction authorization, approval, or denial. However, in other embodiments, service applications 122 may instead provide different computing services, including social networking, microblogging, media sharing, messaging, business and consumer platforms, etc.

Service applications 122 as may provide additional features to service provider server 120. For example, service applications 122 may include security applications for implementing server-side security features, programmatic client applications for interfacing with appropriate application programming interfaces (APIs) over network 140, or other types of applications. Service applications 122 may contain software programs, executable by a processor, including one or more GUIs and the like, configured to provide an interface to the user when accessing service provider server 120, where the user or other users may interact with the GUI to more easily view and communicate information. In various embodiments, service applications 122 may include additional connection and/or communication applications, which may be utilized to communicate information to over network 140.

Additionally, service provider server 120 includes database 124. Database 124 may store various identifiers associated with merchant device 110. Database 124 may also store account data, including payment instruments and authentication credentials, as well as transaction processing histories and data for processed transactions. Database 124 may store received data associated with an account and/or usage of one or more computing services of service provider server 120, which may be used during navigations between different components of service provider server 120. Database 124 may also store data associated with dynamic URL usage, such as dynamic values, strings, or data for one or more variable parameters. Additionally, in order to obscure sensitive data in dynamic URLs, database 124 may include placeholder parameters and IDs, dynamic values 136, static strings 138, and the like for dynamic URLs, as well as mappings, tokens, and other data for determining dynamic values 136 from static strings 138.

In various embodiments, service provider server 120 includes at least one network interface component 126 adapted to communicate merchant device 110, one or more internal and/or external computing services, and/or another device/server for another entity over network 140. In various embodiments, network interface component 126 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2A:
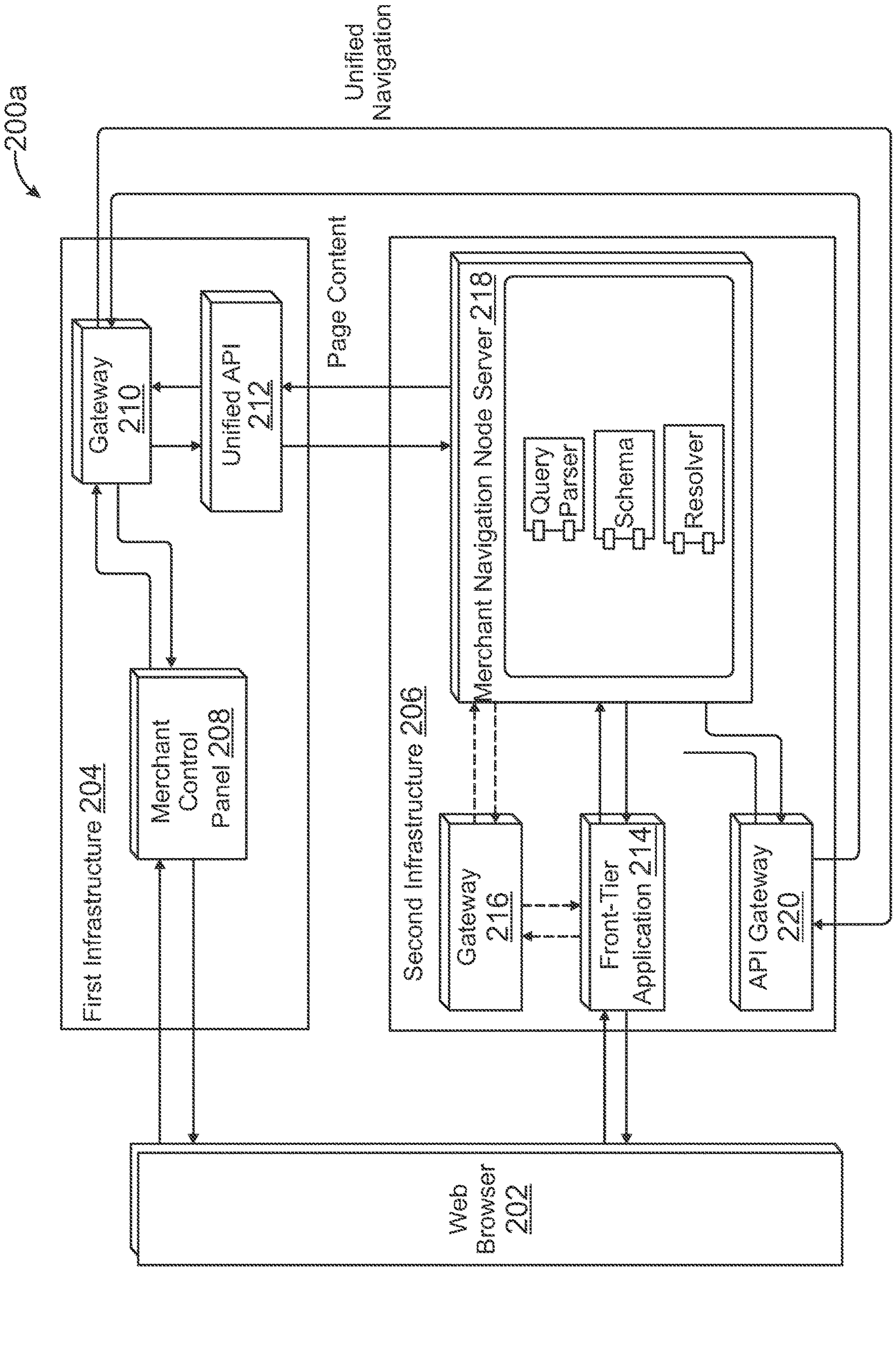
FIG. 2A is an exemplary system architecture for a service provider having multiple computing services and resources that may be navigated to using static URLs having static strings replacing variable parameters in dynamic URLs for sensitive data, according to an embodiment.

FIG. 2A is an exemplary system architecture 200*a* for a service provider having multiple computing services and resources that may be navigated to using static URLs having static strings replacing variable parameters in dynamic ULRs for sensitive data, according to an embodiment. System architecture 200*a* may correspond to the hardware and/or software components of a service provider's computing system and/or platform that may be used to provide unified navigations to computing services and/or resources using URLs. In this regard, system architecture 200*a* may correspond to service provider server 120, which may be in communication with a web browser 202 that may be executed by merchant device 110.

Web browser 202 may be used to access a first infrastructure 204 and a second infrastructure 206. First infrastructure 204 and second infrastructure 206 may correspond to different computing applications, systems, websites, or the like of a service provider, such as service provider server 120. In this regard, first infrastructure 204 may host a website or provide other data that may be navigated to by web browser 202 using a first URL. Similarly, second infrastructure 206 may host a different website or provide further data that may be navigated to by web browser 202 using a second URL. However, first infrastructure 204 and second infrastructure 206 may be hosted by the same service provider and links may be provided by each of first infrastructure 204 and second infrastructure 206 to link between the two infrastructures. First infrastructure 204 may be used to initially provide a merchant control panel 208 and/or another website, application, computing service, and/or online resource. For example, merchant control panel 208 may be used to view a merchant account, maintain that merchant account, process and/or review payments and transactions, or otherwise utilize a computing service provided by a service provider. However, first infrastructure 204 may be separate from one or more other infrastructures and/or computing resources. For example, second infrastructure 206 may be used to provide different computing services. Each accessible infrastructure or other components may be accessible by and/or navigated to using a URL, which may include dynamic URLs having variable parameters with dynamic values, strings, and/or data.

Second infrastructure 206 may provide another computing service and/or platform, which may be accessed using a URL. Second infrastructure 206 provides a front-tier application 214, which may provide a centralized hub that allows navigation to and between different computing services and components provided by the service provider. When executing navigation, and in particular, when navigating between different computing services, interfaces, and/or components, dynamic URLs may be used by web browser with first infrastructure 204 and second infrastructure 206. These dynamic URLs may be used to provide dynamic and/or variable queries and strings in the dynamic URL so that a corresponding server, database, and/or system may provide a customized response and navigation to that particular component, such as a dynamic webpage with database-driven webpage interface output and display. However, in some embodiments, such as when navigating between interfaces where a user or merchant may already be authenticated and/or logged in to an account, the dynamic data in the URL may be sensitive and therefore potentially may be compromised when exposed in a Referer HTTP request header, web logs, shared systems, a browser history and/or cache, and/or through shoulder surfing.

First infrastructure 204 may be connected with second infrastructure 206 through a gateway 210 that communicates with and links to an API gateway 220 for second infrastructure 206. Gateway 210 and API gateway 220 may correspond to components of first infrastructure 204 and second infrastructure 206, respectively, that allow for exchanging data between the two infrastructures. Thus, gateway 210 and API gateway 220 may correspond to software components and network or data exchange gateways. Gateway 210 and API gateway 220 allow for exchanging of data through one or more API requests, calls, and/or responses. Exchanged data may be associated with navigations, as well as with data required when determining dynamic data for variable parameters that have been replaced with a static string. For example, API calls may be executed to fetch data from a mapping and/or database table that maps static strings to their corresponding dynamic data for the variable parameters. Further, the API calls may be used to request a token, such as based on an authentication code or session ID, which may correspond to a UAT for user or merchant IDs and/or authentication credentials.

Front-tier application 214 further links to a gateway 216 that allows for communication with a merchant navigation node server 218. Gateway 216 allows for data exchanges and calls to be performed with merchant navigation node server 218, which allows for navigations to and/or between different computing services and/or components of the service provider by web browser 202. Merchant navigation node server 218 may correspond to a server that may resolve URLs having dynamic queries, strings, or other data replaced with static strings. For example, merchant navigation node server 218 may include a query parser that may parse a URL for queries or other strings based on a schema to identify the static strings in the URL. Merchant navigation node server 218 may then further include a resolver that includes operations to resolve those queries or strings with the dynamic data in order to properly use the URL to point to and/or identify the corresponding webpage or web address of an online resource.

For example, in certain embodiments, front-tier application 214 may be used to provide a dashboard or other centralized access interface that communicates with gateway 216 to execute navigations using URLs by providing the URLs to a backend server or system that processes the URLs and thereafter returns data for outputting a webpage, providing an application interface, accessing an application or computing service, or the like. In some embodiments, merchant navigation node server 218 performs navigations using a URL, which may be in communication with first infrastructure 204 through a unified API 212. Unified API 212 may allow for queries for data to be executed and exchanged. In some embodiments, unified API 212 may correspond to a GraphQL API, which may allow for queries for replacing static strings URLs with the corresponding dynamic data to be exchanged between first infrastructure 204 and second infrastructure 206 using a GraphQL query language. GraphQL queries may be more efficient by specifying the specific data for return from a query. When performing navigations using merchant navigation node server 218, one or more dynamic URLs may be used. However, in order to protect sensitive data in the dynamic URLs, static strings may be used to mask or hide dynamic data that is identified in variable parameters of the dynamic URLs, as discussed herein.

Figure 2B:
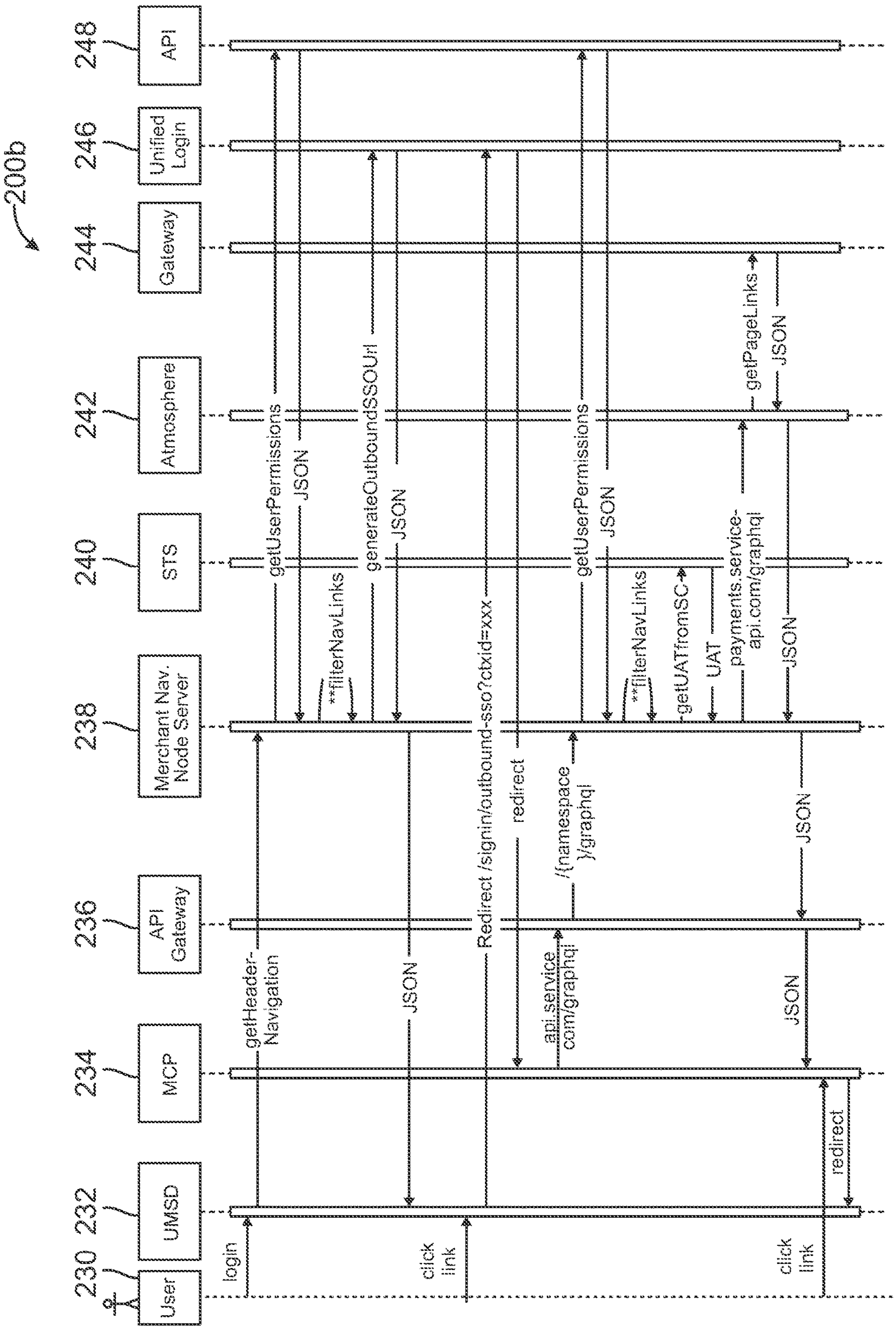
FIG. 2B is exemplary diagram of operations to perform masking of variable parameters in dynamic URLs with static strings, according to an embodiment.

FIG. 2B is exemplary diagram 200*b* of operations to perform masking of variable parameters in dynamic URLs with static strings, according to an embodiment. Diagram

200*b* includes operations that may be performed by a computing device when navigating to online resources and/or services using URLs. For example, diagram 200*b* may be executed by merchant device 110 with service provider server 120 discussed in reference to system 100 of FIG. 1.

In diagram 200*b*, a user 230 (e.g., merchant, customer, end user, or the like) initially accesses a unified merchant servicing dashboard (UMSD) 232, such as a website, application, and/or computing service provided by a service provider and performs a login at UMSD 232. User 230 may correspond to a user using merchant device 110 and may use web browser 202 to access merchant control panel 208 of first infrastructure 204. Thus, UMSD 232 may correspond to first infrastructure 204, such as a website or application that provides a portal to link different computing services, websites, and the like. The login may provide authentication credentials, such as a username, ID, password, or the like. UMSD 232 may be used to link to a merchant control panel 234 that may be provided by another computing system, processing and/or API stack, and/or server(s) of the service provider. UMSD 232 and merchant control panel 234 may be hosted by service provider server 120. Thus, UMSD 232 requires a navigation to merchant control panel 234, which may use a dynamic URL. In order to mask dynamic values, strings, and/or data within the dynamic URL, UMSD 232 may execute one or more operations discussed herein with the dynamic URL to replace variable parameters with static strings to generate a static representation of the dynamic URL. For example, based on the login, UMSD 232 may want to navigate to merchant control panel 234 using a dynamic URL having a merchant or user ID for user 230, which allows for login and sign on with merchant control panel 234 when navigating (e.g., instead of requiring user 230 to go through additional logins and/or authentications).

To do this, UMSD 232 obtains a navigation header from a merchant navigation node server 238, which may be hosted by service provider server 120. Merchant navigation node server 238 then obtains user permissions from an API 248 for merchant control panel 234 and/or used by the computing service providing merchant control panel 234. API 248 responds to merchant navigation node server 238 with the permissions as a JavaScript Object Notation (JSON) file or container. Merchant navigation node server 238 may then filter the navigation links and may generate an outbound single sign-on (SSO) URL with a unified login 246 for UMSD 232 and with merchant control panel 234. Unified login 246 may thereafter respond with a JSON string, which is then routed from merchant navigation node server 238 to UMSD 232. In this regard, unified login 246 may correspond to second infrastructure 206, which may provide the data routed from merchant navigation node server 238 to UMSD 232, such as a portal hosted by first infrastructure 204.

User 230 may then click a link to navigate from UMSD 232 to merchant control panel 234. This may correspond to a navigation between first infrastructure 204 and second infrastructure 206, which may correspond to navigations between different components of service provider server 120 by merchant device 110. UMSD 232 then uses a redirect navigation URL to navigate to unified login 246. However, the URL may be a dynamic URL having replaced dynamic values, strings, and/or data in variable parameters. Thus, to properly redirect with the information and IDs for user 230 without exposing the sensitive data, the URL may include static strings in place of the variable parameters. Unified login 246 performs a redirection to merchant control panel 234. However, for merchant control panel 234 to determine the proper dynamic values for the variable parameters, merchant control panel 234 may execute an API call or request to an API gateway 236, which may utilize GraphQL for the language for the APIs and API calls. GraphQL may be beneficial for API gateway 236 in order for API calls to query the corresponding gateway and specify the data that is to be returned from the query. This allows for more efficient API calling and querying for data so that multiple API calls may not be required and/or unnecessary data may not be returned.

In diagram 200*b* of FIG. 2B, API gateway 236 may correspond and/or provide the same or similar functions to API gateway 220 in system architecture 200*a* of FIG. 2A. Similarly, gateway 244 and atmosphere 242 in diagram 200*b* may correspond and/or provide the same or similar functions to gateway 210 and unified API 212, respectively, in system architecture 200*b*. However, other and/or additional functions may also be provided by each of API gateway 236, gateway 244, and/or atmosphere 242. API gateway 236 interacts with merchant navigation node server 238, which communicates with API 248 to obtain the corresponding permissions, such as based on the login and session ID and/or authentication code for the login session. In this regard, API gateway 236 may be provided by second infrastructure 206 in order to interact with first infrastructure 204 to exchange this data and obtain the corresponding data needed for determination of dynamic data for variable parameters.

Once the permissions are obtained, merchant navigation node server 238 may then filter navigation links and use the permissions to obtain a UAT or other token used to authentication and/or access of user 230 from STS 240. Merchant navigation node server 238 may call STS 240 (e.g., an "identitysecuretokenserv"), where STS 240 may correspond to an authentication service that may generate a UAT in order to make a call to atmosphere 242 (e.g., a Unified GraphQL API) and fetch the navigation links from gateway application 244. Thus, STS 240 provides the UAT to merchant navigation node server 238, which then uses a navigation link to atmosphere 242 to obtain page links with a gateway 244. Gateway 244 may then respond with a JSON string, which may include required data for the navigation to merchant control panel 234. Gateway 244 may be provided by second infrastructure 206 in order to provide data to first infrastructure 204, which may allow for data to be exchanged between different components of service provider server 120. This may allow for the particular redirection and further enable the dynamic data for variable parameters that were replaced static strings in the URL to be used for the particular navigation to merchant control panel 234. The JSON string may be routed from gateway 244 to atmosphere 242, merchant navigation node server 238, API gateway 236, and thereafter to merchant control panel 234. Merchant control panel 234 may then use the dynamic data when performing the navigation and/or redirection (e.g., during a cross-linking event) between first infrastructure 204 and second infrastructure 206. Later, user 230 may further select a link back to UMSD 232, which may navigate merchant control panel back to UMSD 232. This may correspond to navigating back to a webpage or other data hosted by first infrastructure 204 from the data corresponding to second infrastructure 206.

Figure 3:
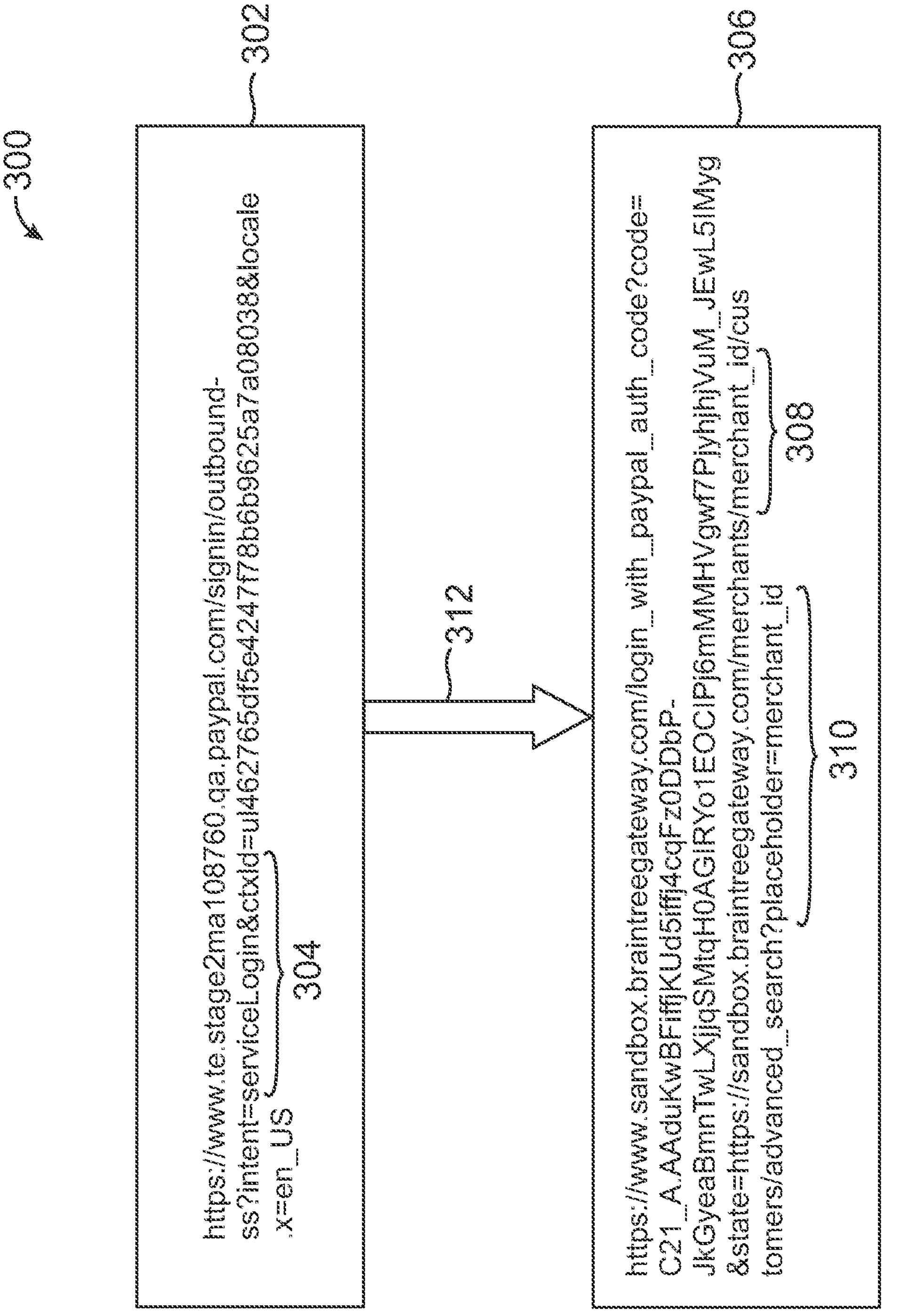
FIG. 3 is an exemplary process that may be used to convert a dynamic URL to a static URL having static strings masking variable parameters, according to an embodiment.

FIG. 3 is an exemplary process 300 that may be used to convert a dynamic URL to a static URL having static strings masking variable parameters, according to an embodiment. Process 300 of FIG. 3 may be used by merchant device 110 discussed in reference to system 100 of FIG. 1. In this regard, merchant device 110 navigates to a component of service provider server 120 using a dynamic URL 302 and/or a static URL 306 as discussed herein.

In process 300, dynamic URL 302 is shown having a variable parameter 304 that shows data for a service login, such as an ID having a dynamic value or string shown as "serviceLogin&ctxld=ul462765df5e4247f78b6b9625a7a0 8038." Dynamic URL 302 may therefore include sensitive data in variable parameter 304, which may risk exposure when revealed in different databases, histories, data communications, and the like when used with a web browser and/or navigation request. Thus, a URL conversion operation 312 may be executed in order to hide the dynamic value or string for the variable parameter with a static value, string, or other data that hides the sensitive data from being revealed. URL conversion operation 312 may first parse and/or process dynamic URL 302 in order to identify variable parameter 304. One or more rules or mappings may designate that variable parameter 304 requires masking, or an intelligent decision-making may be used to identify that the dynamic data in variable parameter 304 corresponds to sensitive data (e.g., based on past compromised data and/or masked data), which may then designate that data for masking using the static string.

URL conversion operation 312 may then determine a static string 308 for static URL 306 that acts to hide the dynamic data in variable parameter. Static or masked URL 306 may not include variable parameter 304 and/or dynamic data in one or more variable parameters. However, in some embodiments, static URL 306 may still include other variable parameters and data, such as those that may not require masking due to sensitive data. Masking of variable parameters to generate static URLs may further benefit legacy computing systems and architectures that may not handle dynamic URLs. Static string 308 may correspond to a string, value, or other data that remains the same between different navigations and/or by different devices or users, but maps to and/or may be used to determine the dynamic data for variable parameter 304. In this regard, one or more rules or IDs may be used to determine static string 308, and further to identify static string 308 later in static URL 306, a placeholder parameter 310 is used, which identifies static string 308 as being a placeholder used to mask variable parameter 304 and/or dynamic data from being used when executing a navigation using static URL 306.

Thereafter, a navigation is executed by entering static URL 306 via a web browser navigation bar or other navigation process on a computing device. This may include a linking or cross-linking event whereby the computing device selects a link, and a server performs a navigation on behalf of the computing device with another backed server for the navigated service or resource. The backend server and/or system that receives and/or detects the navigation event using static URL 306 then parses static URL 306 and identifies static string 308 using placeholder parameter 310. Based on a type of static string 308 (e.g., based on the string, value, or data for static string 308) and/or mapping (e.g., in a database table), the dynamic data for variable parameter 304 may be retrieved. This may include performing a database lookup and/or querying another system for this data. In further embodiments, an authentication code, such as one associated with a session ID and/or login, may be used to request a UAT or other token from another system, which may be used for determination of the dynamic data for variable parameter 304.

Figure 4:
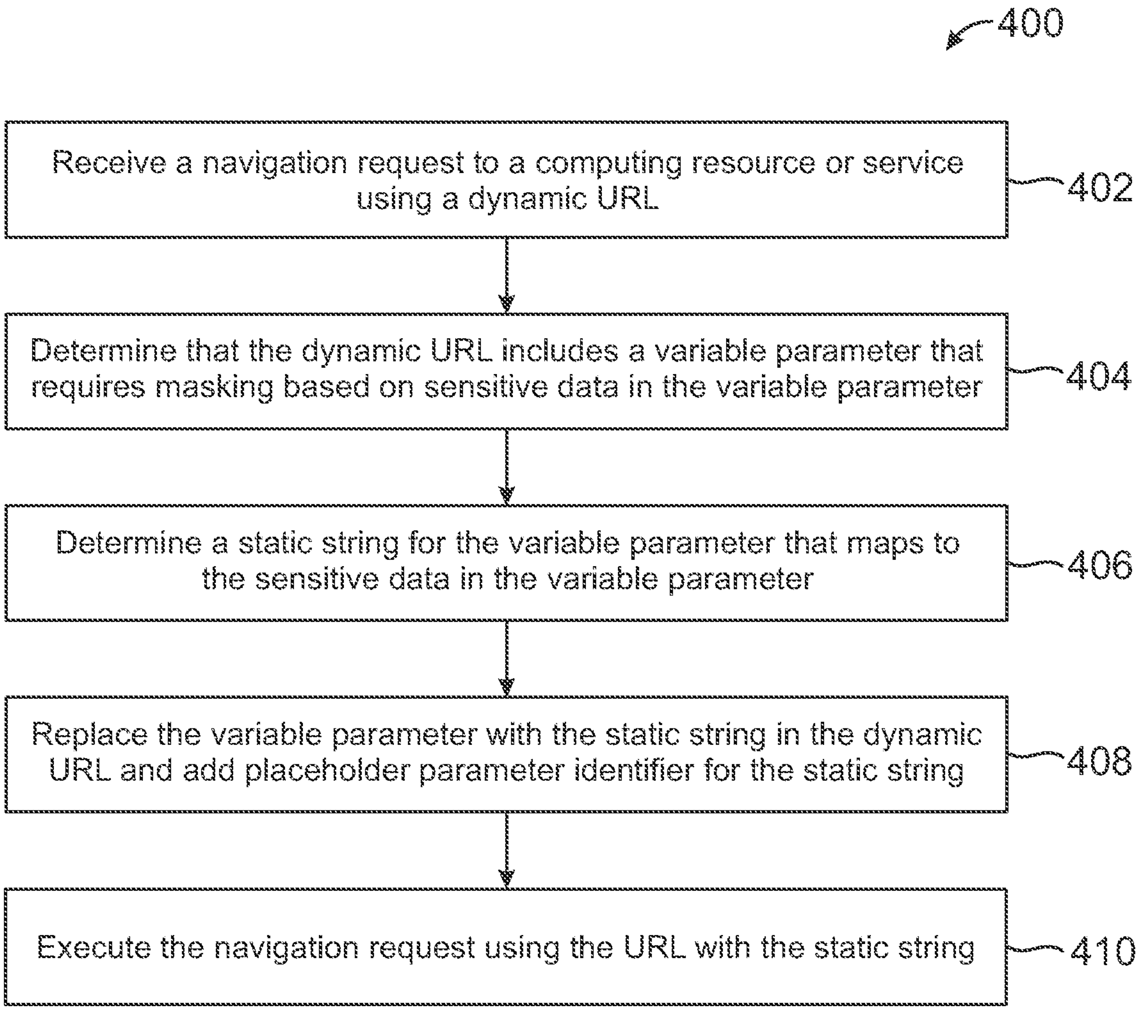
FIG. 4 is a flowchart for processes for static uniform resource locators having placeholder parameters for dynamic values, according to an embodiment.

FIG. 4 is a flowchart 400 for processes for static uniform resource locators having placeholder parameters for dynamic values, according to an embodiment. Note that one or more steps, processes, and methods described herein of flowchart 400 may be omitted, performed in a different sequence, or combined as desired or appropriate.

At step 402 of flowchart 400, a navigation request to a computing resource or service is received using a dynamic URL. The navigation request may correspond to input of the dynamic URL by a computing application or service to a web browser navigation bar or other navigation operation of an application on a computing device. The navigation request may also be performed based on a link selection, clickthrough event, cross-linking event, or the like, which may be performed from a centralized navigation hub, such as a dashboard interface that unifies multiple different websites, applications, computing services, and the like for one or more service providers. The navigation request may be provided by user 230 via UMSD 232 in FIG. 2B, such as when visiting a website or dashboard interface hosted by first infrastructure 204 in FIG. 2A that provides the corresponding data. Further, the navigation request may be a request to navigate to second infrastructure 206 using dynamic URL 302 in FIG. 3.

At step 404, it is determined that the dynamic URL includes a variable parameter that requires masking based on sensitive data in the variable parameter. The dynamic URL may correspond to dynamic URL 302, which is parsed to identify variable parameter 304. Parsing may be performed by first infrastructure 204 in response to the navigation event provided by user 230 via UMSD 232, such as when selecting links on UMSD 232 in order to navigate to merchant control panel 234. The system that generates the dynamic URL may parse the URL prior to its usage for the navigation request to determine that the dynamic URL includes sensitive data. This may also be determined based on dynamic data used in one or more variable parameters, for example, when the system is generating the dynamic URL for usage with the navigation request and provides dynamic data for one or more variable parameters. The dynamic data may be sensitive, and therefore may require masking in order to prevent revealing during data exposure through one or more data logs, histories, or other events that reveal URLs. In various embodiments, sensitive data includes any data the service provider and/or the user would not want made public or accessible to non-intended recipients (entities or individuals), which may include, but is not limited to, passwords, account information, financial information, funding source information, personally identifiable information (PII), and the like.

At step 406, a static string is determined for the variable parameter that maps to the sensitive data in the variable parameter. In FIG. 3, static string 308 in static URL 306 may correspond to the static string that is replaced for the variable parameter in order to mask the dynamic data in the variable parameter. First infrastructure 204 may determine the static string in order to mask this data prior to navigating a device for user 230 to data for second infrastructure 206 in order to prevent data exposure of sensitive data in the URL. For example, the static string may correspond to a placeholder or other ID that prevents revealing of the sensitive data but identifies to a backend system for the resource being navigated to that the static string is meant to replace certain sensitive data (e.g., a user or merchant ID, authentication information, etc.). Thus, the static string may further be used for a backend operation to replace the static string by the backend processor of the navigated to resource, which may determine the sensitive data.

At step 408, the variable parameter with the sensitive data is replaced with the static string in the dynamic URL and a placeholder parameter ID is added for the static string. The placeholder parameter ID may correspond to an additional ID added or appended to the URL after replacing the variable parameter that identifies that the static string in the URL acts as a placeholder for dynamic data that may be sensitive and therefore masked in the URL. When performing the replacing, the URL may now include static elements, which may further allow for use with systems that do not process dynamic URLs. Thus, static URL 306 may be generated that includes static string 308 in static URL 306 with placeholder parameter 310 provided in static URL 306 in order to identify that static string 308 replaces variable parameter 304.

At step 410, the navigation request is executed using the URL with the static string. The URL having the static string may be used to navigate to a resource, service, or the like, such as a webpage of a computing service, where a backend processor, server, and/or system may then process the URL to properly render and output data within an interface of the computing device performing the navigation. When the device for user 230 uses static URL 306 to navigate to a corresponding resource (e.g., a webpage or data hosted by second infrastructure 206), backend operations of second infrastructure 206 (e.g., merchant navigation node server 218) may be executed to identify the corresponding dynamic data that was masked using static string 308. This allows for determination of the dynamic data for variable parameter 304 so that a correspond webpage or interface may be customized and/or dynamically displayed to user 230. The backend operations of this system may then parse the URL to identify the static string using the placeholder parameter that identifies the static string and designates that static string as replacing dynamic data. The operations may then use the static string with one or more mappings, rules, and/or API requests to retrieve the dynamic data and properly output the interface data, such as based on database-driven data for queries based on the dynamic data. This may also be done using an authentication code for a login session that may be used to retrieve a UAT or other token for determination of the dynamic data. Thereafter, the online resource receiving the navigation request may provide a customized output on the computing device that is dependent on the dynamic data originally in the dynamic URL that was masked.

Figure 5:
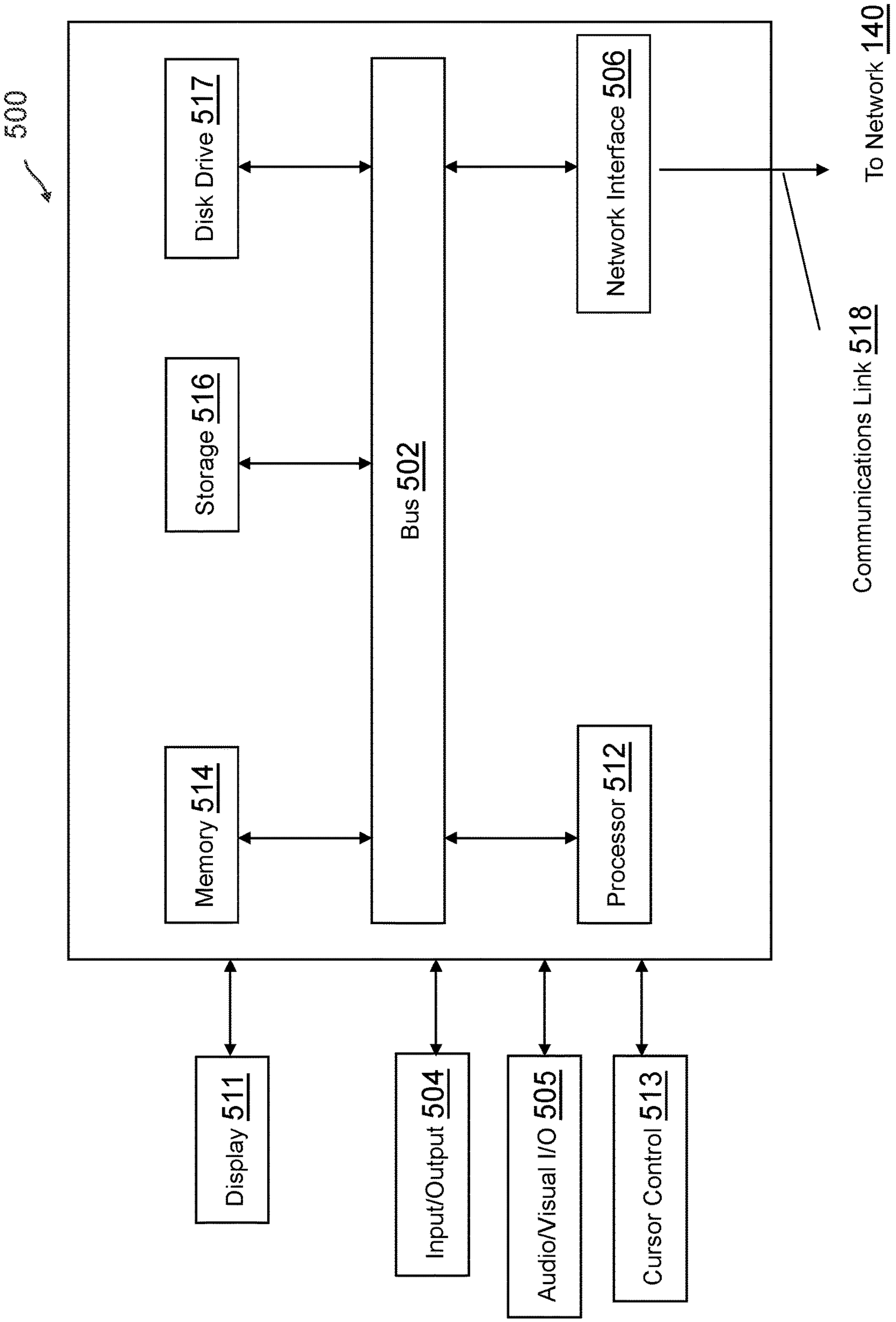
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on iframes, mobile web browsers, and webpages, other types of injectable coded data, applications, and sources are also within the scope of various embodiments of the invention. Thus, the present disclosure is limited only by the claims.

What is claimed is:

1. A system comprising:

a non-transitory memory; and one or more hardware processors coupled to the non-transitory memory and configured to read instructions from the non-transitory memory to cause the system to perform operations comprising:

receiving, based on a navigation request from a computing device to an online resource of a computing service associated with the system, an application programming interface (API) call for a dynamic uniform resource locator (URL) for the online resource of the computing service;

determining data for a variable parameter that enables the computing service to configure the online resource for the computing device for a session between the computing device and a previous system accessed by the computing device, wherein the previous system is separate from the system associated with the computing service;

determining that the data for the variable parameter is usable to authenticate the computing device with the computing service based on the session with the previous system;

determining to mask the data for the variable parameter in at least a portion of the dynamic URL based on one or more variable parameters designated for masking in the dynamic URL and the session, wherein the session indicates that the data for the variable parameter is sensitive data that requires masking, and wherein the determining to mask is based on one or more rules or mappings that designate which of the one or more variable parameters contain the sensitive data that requires masking;

generating a static representation of the dynamic URL by:

replacing the variable parameter with a static string in the dynamic URL, wherein the static string maps to the variable parameter with the computing service, and adding a placeholder parameter identifier for the static string to the dynamic URL, wherein the placeholder parameter identifier indicates that the static string is to be replaced with the variable parameter by the computing service; and executing, with the computing device based on the navigation request, a navigation to the online resource of the computing service using the static representation of the dynamic URL, wherein the executing the navigation comprises:

receiving the placeholder parameter identifier having the static string from the computing service;

identifying the variable parameter for the dynamic URL based on the static string and the placeholder parameter identifier;

executing a call to the online resource corresponding to the variable parameter; and navigating the computing device to a webpage associated with the computing service.

2. The system of claim 1, wherein a backend processing server of the computing service replaces the static string with the variable parameter in the static representation based on the placeholder parameter identifier, and wherein the operations further comprise:

loading the online resource on the computing device after the navigating.

3. The system of claim 1, wherein the system further comprises a digital account dashboard and the computing service as separate processing stacks of the system, wherein the API call is received from the digital account dashboard based on the navigation request, and wherein the operations further comprise:

parsing, using a backend processing server of the computing service, the static representation of the dynamic URL for the variable parameter using the placeholder parameter identifier; and replacing, by the backend processing server, the static string with the variable parameter in the static representation.

4. The system of claim 3, wherein prior to the replacing the static string with the variable parameter, the executing the navigation further comprises:

determining an authentication code associated with the session;

executing an application programming interface (API) call for a universal access token (UAT) from an Open Authentication API of the system;

receiving the UAT responsive to the API call for the UAT; and determining the variable parameter for the static string using the UAT.

5. The system of claim 3, wherein the operations further comprise:

providing a mapping of the variable parameter to the static string to the backend processing server of the computing service.

6. The system of claim 1, wherein the one or more variable parameters designated for masking comprise a plurality of data variable types used by the system for dynamic URLs, and wherein the plurality of data variable types comprise at least one of a username, a user identifier, a merchant identifier, credential information, encrypted identifiers, or hashed data.

7. The system of claim 1, wherein prior to the receiving the navigation request, the operations further comprise:

providing a digital account dashboard on the computing device; and providing an API gateway for the digital account dashboard, wherein the API gateway enables API calls using the system to a plurality of additional dashboards for a plurality of computing services including the computing service.

8. The system of claim 7, wherein each of the plurality of additional dashboards is displayable on the computing device via the digital account dashboard.

9. The system of claim 1, wherein the navigation request comprises a redirection request to the dynamic URL specified for the computing service prior to an authentication of the computing device with the computing service, and wherein the dynamic URL exposes data for a login session by the computing device in the variable parameter.

10. The system of claim 1, wherein an authentication code is provided for the computing device based on a session cookie generated during a login by the computing device to the digital account dashboard.

11. A non-transitory machine-readable medium having stored thereon machine-readable instructions executable to cause a machine to perform operations comprising:

detecting, by a computing service of an application of a service provider, a navigation event from the application to a webpage of a merchant entity by a computing device, wherein the navigation event requests a redirection from the application to the webpage using a uniform resource locator (URL) having a placeholder static string in place of a dynamic portion in the URL;

parsing, by the computing service, the URL for a placeholder identifier for the placeholder static string of the dynamic portion, wherein the dynamic portion is associated with a variable parameter that loads variable data for the merchant entity, and wherein the webpage is configured based on the variable data responsive to the navigation event having the URL with the dynamic portion, and wherein the variable data is masked for a session between the computing device and the computing service that is associated with the navigation event, wherein the variable data is usable to authenticate the computing device with the computing service, and wherein the masking is based on one or more rules or mappings that designate which variable parameters requiring masking in URLs;

identifying the variable parameter for the dynamic URL based on the placeholder static string;

replacing, by the computing service, the placeholder static string with the dynamic portion in the URL;

executing a call to the webpage for variable data corresponding to the variable parameter;

causing the navigation event to be executed from the application to the webpage based on the URL having the replaced placeholder static string; and providing the variable data that enables configuring the webpage.

12. The non-transitory machine-readable medium of claim 11, wherein the parsing, the identifying, and the replacing are performed by a backend server of the computing service responsive to the navigation event to the URL of the webpage.

13. A method comprising:

receiving, based on a navigation request from a computing device to an online resource of a computing service associated with a system, an application programming interface (API) call for a dynamic uniform resource locator (URL) for the online resource of the computing service;

determining data for a variable parameter that enables the computing service to configure the online resource for the computing device for a session between the computing device and a previous system accessed by the computing device, wherein the previous system is separate from the system associated with the computing service;

determining that the data for the variable parameter is usable to authenticate the computing device with the computing service based on the session with the previous system;

determining to mask the data for the variable parameter in at least a portion of the dynamic URL based on one or more variable parameters designated for masking in the dynamic URL and the session, wherein the session indicates that the data for the variable parameter is sensitive data that requires masking, and wherein the determining to mask is based on one or more rules or mappings that designate which of the one or more variable parameters contain the sensitive data that requires masking;

generating a static representation of the dynamic URL by:

replacing the variable parameter with a static string in the dynamic URL, wherein the static string maps to the variable parameter with the computing service, and adding a placeholder parameter identifier for the static string to the dynamic URL, wherein the placeholder parameter identifier indicates that the static string is to be replaced with the variable parameter by the computing service; and executing, with the computing device based on the navigation request, a navigation to the online resource of the computing service using the static representation of the dynamic URL, wherein the executing the navigation comprises:

receiving the placeholder parameter identifier having the static string from the computing service;

identifying the variable parameter for the dynamic URL based on the static string and the placeholder parameter identifier;

executing a call to the online resource corresponding to the variable parameter; and navigating the computing device to a webpage associated with the computing service.

14. The method of claim 13, wherein a backend processing server of the computing service replaces the static string with the variable parameter in the static representation based on the placeholder parameter identifier, and wherein the method further comprises:

loading the online resource on the computing device after the navigating.

15. The method of claim 13, wherein the system comprises a digital account dashboard and the computing service as separate processing stacks of the system, wherein the API call is received from the digital account dashboard based on the navigation request, and wherein the method further comprises:

parsing, using a backend processing server of the computing service, the static representation of the dynamic URL for the variable parameter using the placeholder parameter identifier; and replacing, by the backend processing server, the static string with the variable parameter in the static representation.

16. The method of claim 15, wherein prior to the replacing the static string with the variable parameter, the executing the navigation further comprises:

determining an authentication code associated with the session;

executing an application programming interface (API) call for a universal access token (UAT) from an Open Authentication API of the system;

receiving the UAT responsive to the API call for the UAT; and determining the variable parameter for the static string using the UAT.

17. The method of claim 15, further comprising:

providing a mapping of the variable parameter to the static string to the backend processing server of the computing service.

18. The method of claim 13, wherein the one or more variable parameters designated for masking comprise a plurality of data variable types used by the system for dynamic URLs, and wherein the plurality of data variable types comprise at least one of a username, a user identifier, a merchant identifier, credential information, encrypted identifiers, or hashed data.

19. The method of claim 13, wherein prior to the receiving the navigation request, the method further comprises:

providing a digital account dashboard on the computing device; and providing an API gateway for the digital account dashboard, wherein the API gateway enables API calls using the system to a plurality of additional dashboards for a plurality of computing services including the computing service.

20. The method of claim 19, wherein each of the plurality of additional dashboards is displayable on the computing device via the digital account dashboard.

* * * * *